United States Patent [19]
Wartel et al.

[11] Patent Number: 6,142,165
[45] Date of Patent: Nov. 7, 2000

[54] METHOD AND APPARATUS FOR INSTALLING A BRANCH CONNECTOR FROM THE TOP OF AN EXCAVATION

[75] Inventors: Christian Wartel, Paris; Dominique Pfeiffer, Ermenonville; Patrick Le Cointe, Bouffemont, all of France

[73] Assignee: Gaz de France, France

[21] Appl. No.: 09/151,073

[22] Filed: Sep. 10, 1998

[30] Foreign Application Priority Data

Sep. 10, 1997 [FR] France .................................. 97 11224

[51] Int. Cl.[7] ............................ F16K 43/00; F16L 41/06; F16L 41/12; F16L 41/16
[52] U.S. Cl. .................... 137/15.13; 29/213.1; 29/221.6; 29/281.5; 29/402.15; 29/559; 137/15.08; 137/318; 285/18; 285/24; 285/27; 285/197; 285/198; 138/97
[58] Field of Search ......................... 137/15, 318, 15.08, 137/15.13; 29/213.1, 221.6, 281.1, 281.5, 402.15, 559, 526.2; 285/18, 19, 24, 27, 197, 198, 199; 405/154, 156; 408/87, 99, 103, 104; 138/97

[56] References Cited

U.S. PATENT DOCUMENTS

| | | | |
|---|---|---|---|
| 4,519,124 | 5/1985 | Burghardt | 138/97 |
| 4,647,073 | 3/1987 | Kosaka | 137/318 |
| 4,832,069 | 5/1989 | Gale et al. | 137/318 |
| 5,659,935 | 8/1997 | Lo-Pinto et al. | 137/318 |
| 5,740,829 | 4/1998 | Jacobs et al. | 137/318 |

FOREIGN PATENT DOCUMENTS

| | | |
|---|---|---|
| 0205696 | 12/1986 | European Pat. Off. |
| 2714710 | 7/1995 | France |

*Primary Examiner*—George L. Walton
*Attorney, Agent, or Firm*—Ostrolenk, Faber, Gerb & Soffen, LLP

[57] ABSTRACT

The invention relates to a method and apparatus for installing a branch connector on a buried pipe for transporting a fluid, and to do so by means of a multi-purpose long handle from the top of an excavation. The apparatus comprises a bottom saddle positioner having a support structure on which there are disposed firstly clamping connection means adapted to the diameter of the pipe together with a support adaptor for supporting a bottom saddle, and secondly means for releasably fixing the positioner to the end of the multi-purpose long handle and situated on the side of the support structure opposite from its side on which the clamping connection means are situated. Removable means can be fitted to the end of the multi-purpose long handle to put the branch connector into place on the pipe above the bottom saddle, to make a mechanical connection between the branch connector and the bottom saddle, to disconnect the bottom saddle positioner from the pipe, and to perform the operations of welding the branch connector to the pipe, of piercing the shank of the branch connector and of putting a cap into place on the shank.

10 Claims, 14 Drawing Sheets

METHOD AND APPARATUS FOR INSTALLING A BRANCH CONNECTOR FROM THE TOP OF AN EXCAVATION

The present invention relates to a method and to an apparatus for installing a branch connector on a buried fluid-transport pipe, working from the top of an excavation.

BACKGROUND OF THE INVENTION

It is often necessary to install branch connectors on pipes, such as the pipes used for distributing gas and water. In built-up areas, it is desirable to dig excavations of small size in order to limit the inconvenience caused to pedestrian or vehicle traffic. There is therefore no question of digging a trench large enough to allow a person to go down to the bottom of the trench, so it must be possible for the operations of installing the connector to be performed from the top of the excavation.

When the pipe and the branch connector are made of a hot-melt material such as polyethylene, the connector is generally secured to the pipe by welding. The body of the branch connector is saddle-shaped and is fitted with an electrical resistance connected between two power feed terminals for connection to an electricity power supply for performing the welding operation by melting the saddle of the connector and welding it onto the portion of the length of pipe which is in contact with the saddle. In order to ensure that the welding operation is performed properly, it is necessary for the branch connector to be held pressed against the pipe. For that purpose, a bottom saddle is provided which is placed beneath the pipe and which is connected to the top saddle belonging to the body of the branch connector. By connecting together the bottom saddle and the body of the branch connector fitted with the welding means, it is possible to guarantee clamping against the pipe under conditions that are well defined and reproducible, thus making it possible to obtain an approved assembly between the branch connector and bottom saddle.

Proposals have already been made, in particular in documents FR-A-2 714 710 and EP-A-0 205 696 for equipments making it possible to install a saddle-shaped branch connector on a pipe from the top of an excavation dug around the zone in which the connector is to be installed, thereby making it possible to dig an excavation of small dimensions given that it is no longer necessary for a person to go down to the bottom of the excavation.

Nevertheless, those prior art equipments remain quite complex and therefore quite expensive, and they are also tied up throughout the welding operation, given that they contribute to exerting a clamping force on the branch connector. The use of such equipments also makes it necessary to perform various tests in order to guarantee that the weld is of good quality, which is essential when the pipe is for distributing gas, since there must be no risk of a leak.

OBJECTS AND SUMMARY OF THE INVENTION

The invention seeks to remedy the above-mentioned drawbacks by enabling a branch connector to be installed from the top of an excavation of small size, to do so at low cost, without requiring specialized equipment to be left in place throughout the time required for the connector to cool after the operation of being welded onto a pipe, and without it being necessary to perform tests on the weld, given that the branch connector is put into place with its bottom saddle which itself serves to provide clamping against the pipe under predetermined conditions.

Another object of the invention is to enable a branch connector to be put into place using equipment that is lightweight and compact, and that does not require difficult operations to be performed while it is being installed.

These objects are achieved by a method of installing a branch connector on a buried pipe for transporting a fluid, and to do so from the top of an excavation, the method comprising the following steps:

a) digging an excavation of small size so as to disengage the surroundings of the length of pipe onto which the branch connector is to be installed;

b) installing a bottom saddle that is separable from the branch connector onto a bottom saddle adaptor, itself mounted on a bottom saddle positioner provided with clamps adapted to the diameter of the pipe;

c) lowering the bottom saddle positioner into the excavation by means of a multi-purpose long handle engaging the positioner;

d) using the clamps to mount the bottom saddle positioner on the disengaged length of pipe;

e) disconnecting the multi-purpose long handle from the positioner and pressing on the bottom saddle positioner so as to cause it to turn around the pipe until the bottom saddle is positioned beneath the pipe;

f) mounting the shank of the branch connector on the end of the multi-purpose long handle and lowering the branch connector to the pipe;

g) putting the branch connector into place on the bottom saddle and fixing it there by means of a screwdriver endpiece fixed to the end of the multi-purpose long handle;

h) using a tool with arms mounted on the multi-purpose long handle to disconnect the positioner from the bottom saddle while leaving the bottom saddle in place:

i) raising the bottom saddle positioner from the excavation; and j) proceeding with the operations of welding the branch connector, piercing the branch connector, and placing a cap on the shank of the connector.

The invention also provides apparatus for installing a branch connector on a buried pipe for transporting a fluid, and for doing so by means of a multi-purpose long handle from the top of an excavation, the device comprising a bottom saddle positioner comprising a support structure on which there are disposed firstly clamp connection means adapted to the diameter of the pipe and an adaptor for supporting a bottom saddle, and secondly means for being removably fixed to the end of the multi-purpose long handle and situated on the opposite side of the support structure relative to the clamp connection means, and removable means adaptable to the end of the multi-purpose long handle to install the branch connector on the pipe above the bottom saddle, to establish a mechanical connection between the branch connector and the bottom saddle, to disconnect the bottom saddle positioner from the pipe, and to perform the operations of welding the branch connector to the pipe, of piercing the shank of the branch connector, and of putting a cap into place on said shank.

In a particular embodiment, the support structure of the bottom saddle positioner comprises a horizontal bar parallel to the length of pipe and two crossbars fixed to the horizontal bar and situated on either side of the bottom saddle adaptor and of the means for removably fixing to the end of the multi-purpose long handle.

According to a particular characteristic, the removable means for disconnecting the bottom saddle positioner relative to the pipe comprise at least two vertical rods connected to an endpiece for fixing to the end of the multi-purpose long handle so that each bears against a respective one of the ends of the crossbars situated on either side of the pipe.

According to another particular characteristic, the removable means for mechanically connecting the branch connector and the bottom saddle comprise screw means connected to a fixing endpiece at the end of the multi-purpose long handle.

In a particular embodiment, the adaptor for a strap-type bottom saddle comprises an arcuate body fixed to the support structure of the bottom saddle positioner on the same side as the clamp connection means, and resilient tongues fixed to the ends of said body of arcuate shape.

In another particular embodiment, the adaptor for a slide-type bottom saddle comprises means for removably fixing the bottom saddle to the support structure of the bottom saddle positioner on the same side as the clamp connection means.

In which case, the slide-type bottom saddle comprises, on either side of a central portion, firstly a fixed slide for receiving a first flange of the branch connector, and secondly a tiltable slide having a portion capable of tilting and coming down against an abutment to overlie a second flange of the branch connector.

In yet another particular embodiment, the adaptor for a rigid-type bottom saddle having screws comprises a set of flexible blades fixed to the support structure of the bottom saddle positioner on the same side as the clamp connection means.

In which case, advantageously, the screw-type bottom saddle comprises on either side of a central portion in the form of a cradle, horizontal flanges pierced by screw-passing holes, and the removable means for making a mechanical connection between the branch connector and the bottom saddle also comprise positioning means connected to a fixing endpiece at the end of the multi-purpose long handle and including two rods for holding in position portions penetrating in two of the screw-passing holes formed in the branch connector and in the bottom saddle to hold the branch connector in position relative to the bottom saddle during the beginning of the operation of engaging screws in the screw-passing holes that remain empty.

BRIEF DESCRIPTION OF THE DRAWINGS

Other characteristics and advantages of the invention appear from the following description of particular embodiments, given as examples with reference to the accompanying drawings, in which.

MORE DETAILED DESCRIPTION

The method and the equipment of the invention are initially described with reference to a first embodiment shown in FIGS. 1 to 7.

Once an excavation of small size has been dug, e.g. having a section of 0.40 meters (m)×0.40 m, so as to clear a length of pipe 1 onto which the branch connector is to be installed in association with a bottom saddle 100, the bottom saddle 100 is mounted on a bottom saddle positioner 10.

Figure 4:
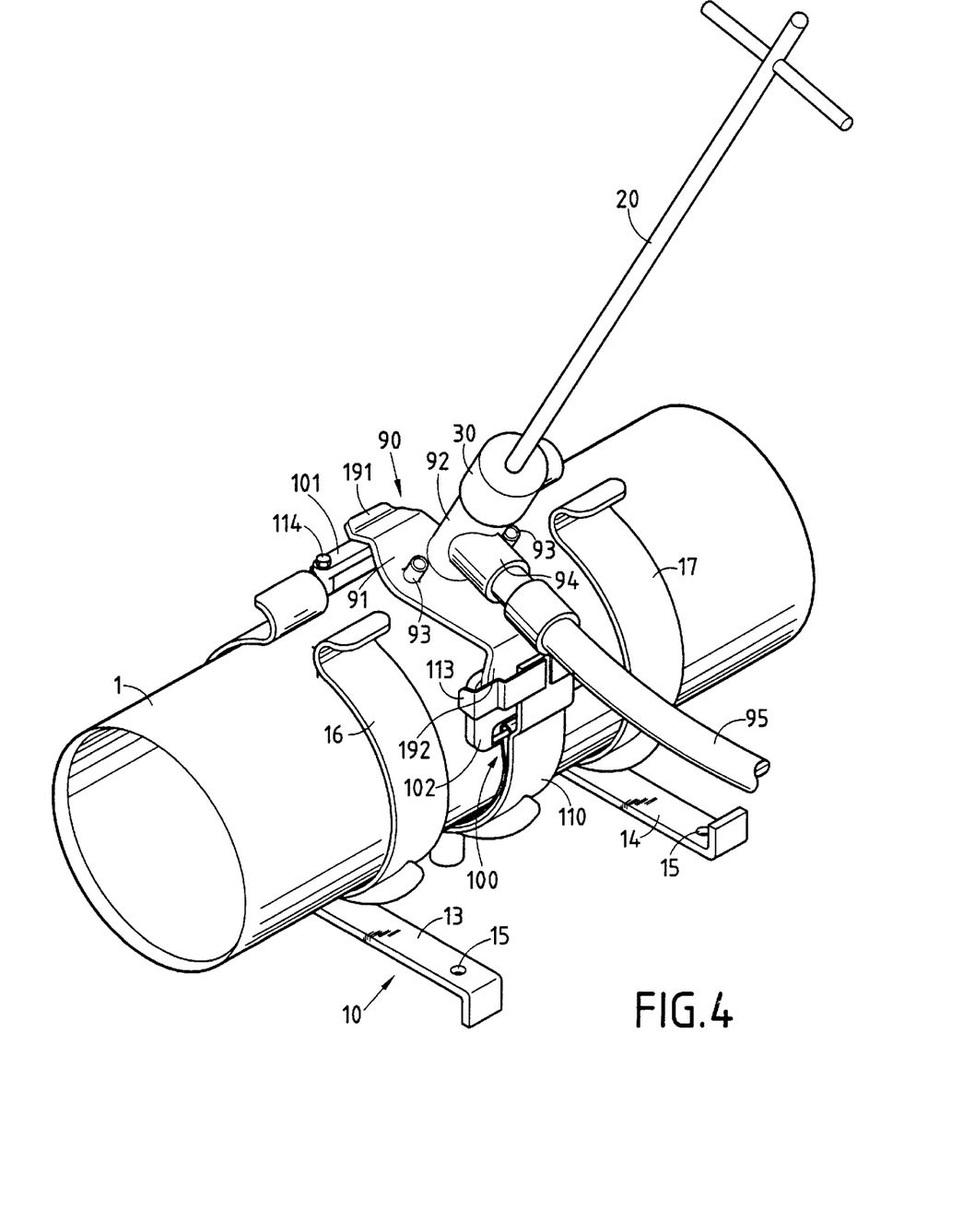
FIG. 4 is a perspective view showing a branch connector being installed on the bottom saddle of FIG. 3 while held in place by a bottom saddle positioner.
Figure 5:
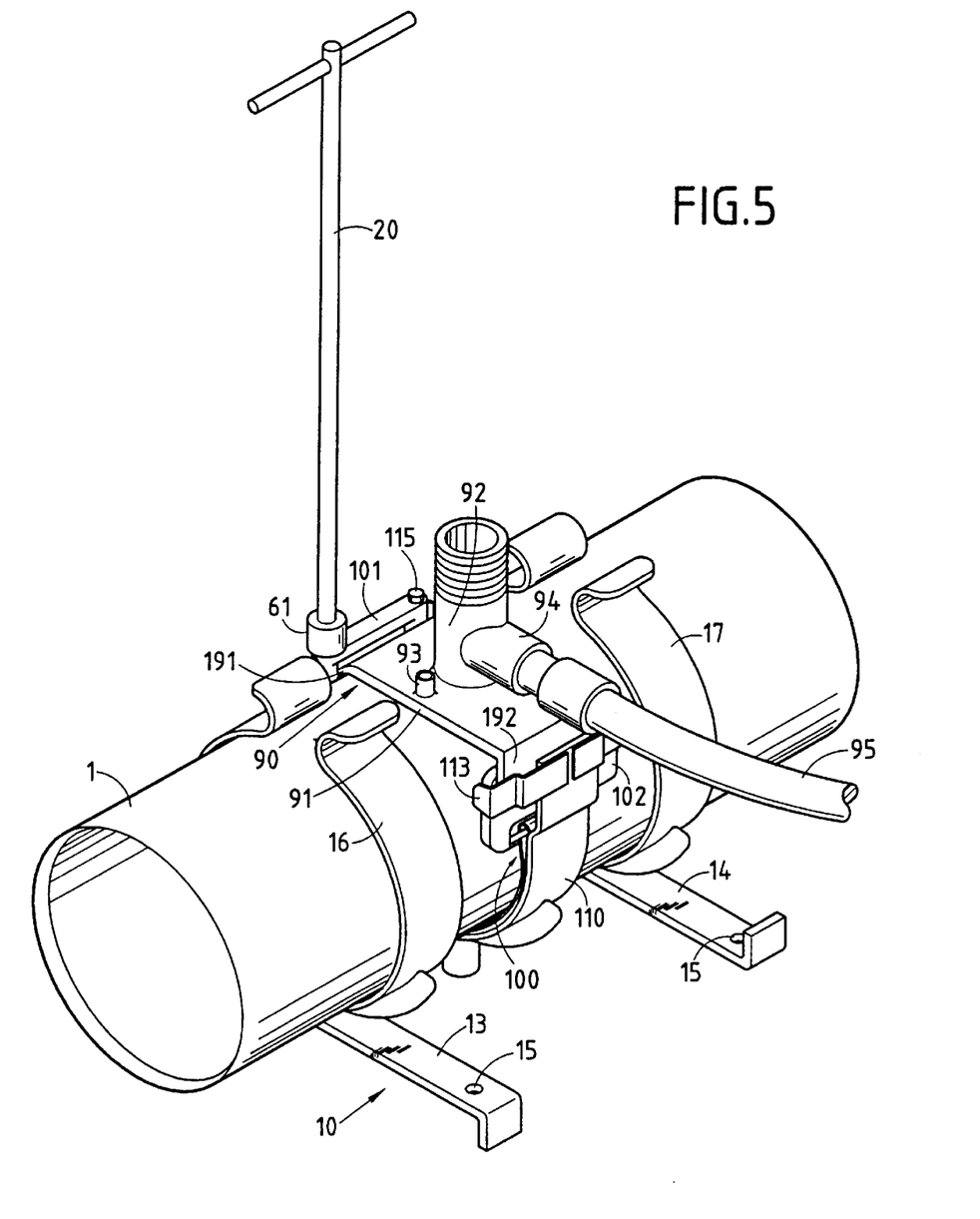
FIG. 5 is a perspective view analogous to that of FIG. 4, but showing the branch connector being fixed on the bottom saddle.

In the example shown (FIGS. 1 to 7), the bottom saddle 100 is flexible and comprises a strap attached to two rigid end blocks 101 and 102. The end block 102 is provided with a notch for receiving a first tab 192 of a branch connector 90, while the end block 101 also defines a notch but of variable height for receiving a second tab 190 of the branch connector 90 (FIG. 4). Screws 114 and 115 serve to retain the second tab 191 in the empty space forming the gap provided beneath the rigid part 101 constituting an end block that is adjustable in position (FIG. 5).

Before taking hold of the branch connector 90, the bottom saddle 100 is mounted on an adaptor 110 comprising a resilient body in the form of an arc fixed to a beam 11 of a support structure. The adaptor 110 has a tongue 113 fixed at one end of the body of arcuate shape to receive the end block 102 of the bottom saddle 100, and two tongues 111 and 112 situated a short distance apart at the other end of the body of arcuate shape to receive the parts constituting the end block 101 that is adjustable in position.

The bottom saddle adaptor 110 is mounted in a central position on a first face of the beam 11 of the bottom saddle positioner 10. Clamps 16 and 17, e.g. in the form of clips, are of a diameter that matches that of the pipe 1 and are mounted on the first face of the beam 11 on either side of the adaptor 110. A screw connection device 12 is disposed in a central position on a second face of the beam 11 opposite from its first face.

In addition to the main beam 11, the support structure of the positioner 10 has two crossbars 13 and 14 fixed on the main beam 11 and situated on either side of the adaptor 110. Orifices 15 are formed close to the ends of each of the crossbars 13, 14, which bars may be constituted by flat strips.

Figure 7:
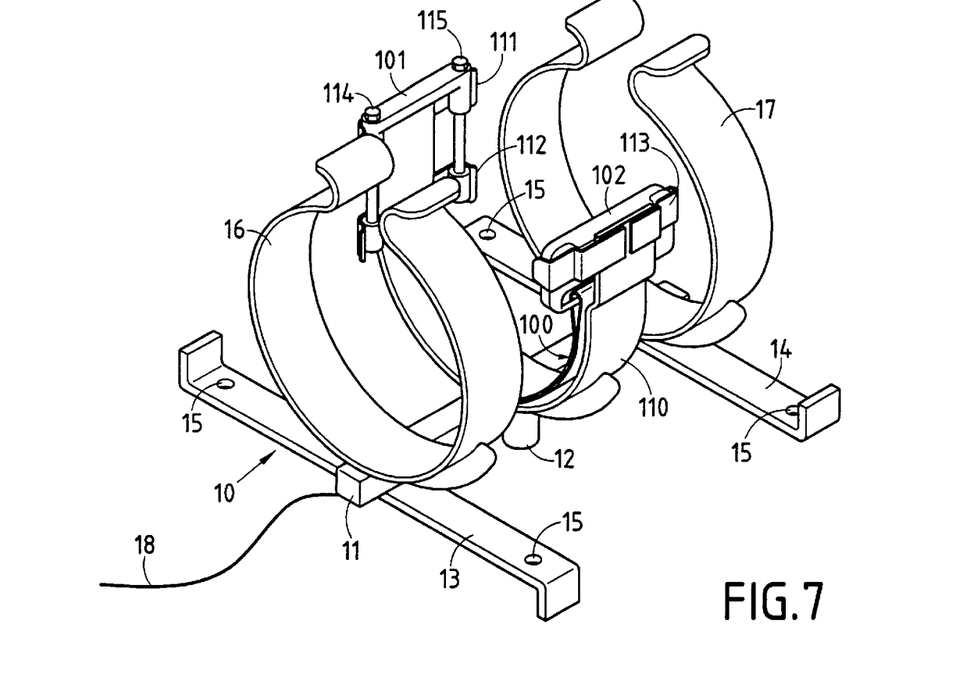
FIG. 7 is a perspective view of the bottom saddle positioner used in the embodiment of FIGS. 1 to 6 with a strap-type bottom saddle installed in the bottom saddle positioner.

FIG. 7 shows the entire positioner 10 fitted with a bottom saddle 100 of the strap type.

Figure 1:
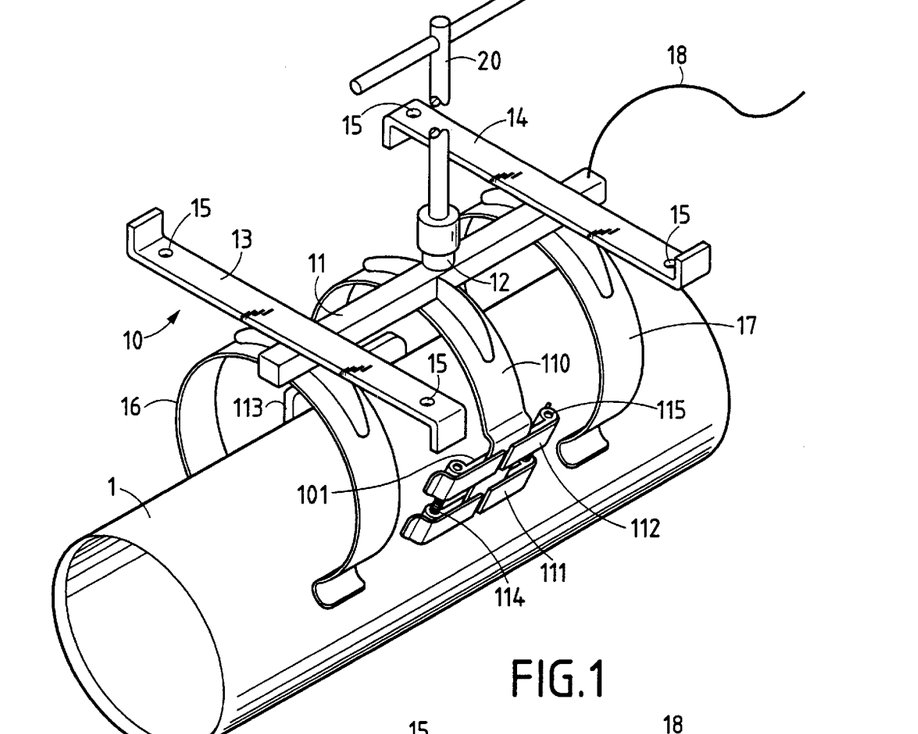
FIG. 1 is a perspective view of a first embodiment of the invention, corresponding to a step performed above a pipe to install equipment for positioning a bottom saddle of a branch connector.

FIG. 1 shows the positioner 10 of FIG. 7 fitted with the bottom saddle 100, fixed by its screw connection device 12 to the endpiece of a multi-purpose long handle 20 of the same general configuration as a stopcock key. The long handle is used to lower the positioner 10 down to the pipe 1, with its main beam 11 being disposed longitudinally along the axis of the pipe 1.

Figure 2:
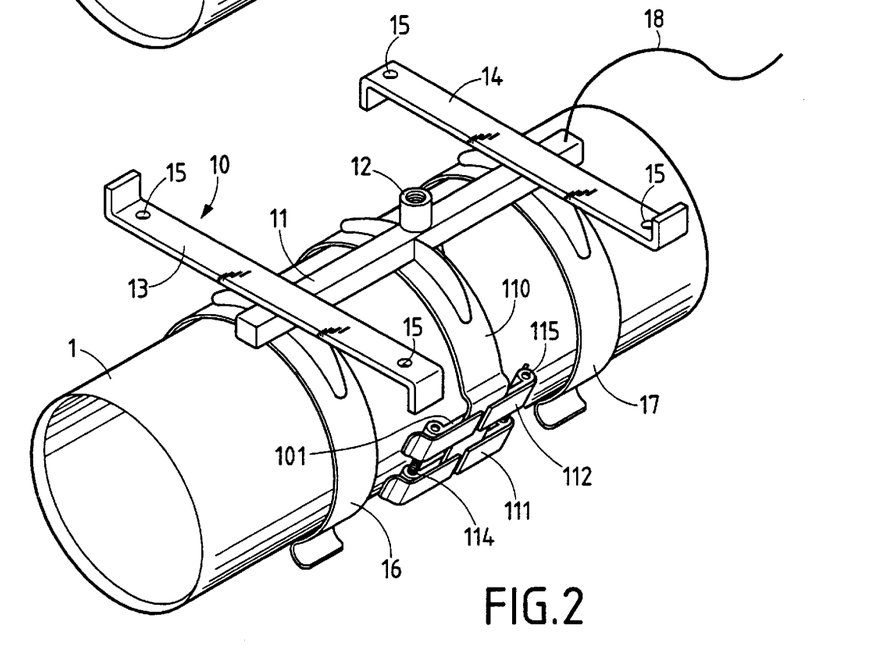
FIG. 2 is a view analogous to FIG. 1, but showing a step performed on the pipe to install the equipment for positioning the bottom saddle.

FIG. 2 shows a step that follows that of FIG. 1. After downward pressure has been exerted manually on the long handle 20, the clamps 16 and 17 open and then engage around the pipe 1 so that the positioner 10 is thus mounted on the pipe 1 with the bottom saddle 100 being held by its adaptor 100 so that it too is pressed against the pipe 1. The long handle 20 is then disconnected from the screw connection device 12 and it is used to exert a downward force on one end of one of the crossbars 13, 14 so as to cause the positioner assembly 10 to turn upside-down and occupy the position shown in FIG. 3 after turning through 180°. In this position, the bottom saddle 100 is correctly placed in contact with the bottom portion of the pipe 1.

FIG. 4 shows a following step during which a branch connector 90 comprising a base plate 91, a central shank 92, welding studs 93, a branch sleeve 94 associated with a branch tube 95, and end tabs 191 and 192, has its shank 92 mounted on a part-carrier endpiece 30 of the long handle 20 and is lowered down to the pipe 1. One of the end tabs 192 of the branch connector 90 is engaged in a recess in the end block 102 of the bottom saddle 100, while the other end tab 191 is engaged in a recess of adjustable dimensions situated beneath the end block 101 of the bottom saddle 100.

The long handle 20 can then be removed from the shank 92 and can be used, by means of a screwdriver endpiece 61 fitted to its end, to tighten the fixing screws 114 and 115 so as to hold the end tab 191 of the connector 90 captive beneath the block 101 of the bottom saddle 100 (FIG. 5).

Figure 6:
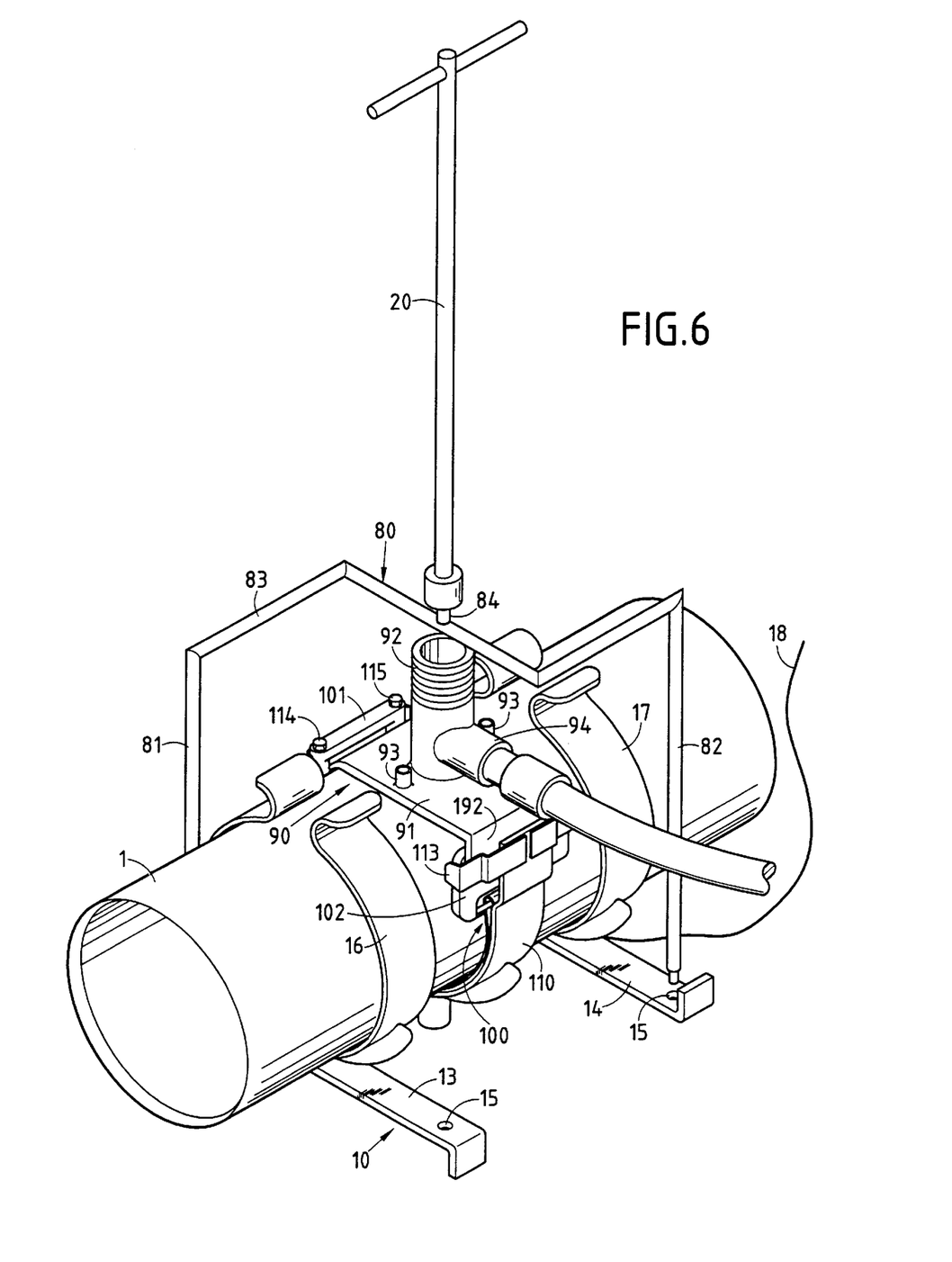
FIG. 6 is a perspective view analogous to that of FIG. 5, but showing the putting into place of a tool for disconnecting the bottom saddle positioner.

The following step, shown in FIG. 6, consists in recovering the positioner 10 while leaving the branch connector 90 in place clamped independently to the pipe 1 by means of the bottom saddle 100. For this purpose, a disconnection tool 80 is used which comprises two vertical rods 81 and 82 that are offset and interconnected by horizontal branches 83 to a central endpiece 84 for connection to the endpiece of the long handle 20. By exerting a downward force manually on the long handle 20, downward forces are exerted by the vertical rods 81 and 82 on the crossbars 13 and 14 on either side of the pipe 1. The vertical rods 81 and 82 are advantageously provided with small-sized end portions which just fit in the orifices 15 formed in the crossbars 13 and 14. It is then certain that the disconnection tool 80 is properly positioned relative to the crossbars 13 and 14. It would be possible to provide a disconnection tool 80 made up of four vertical rods acting on each of the bars 13 and 14 on either side of the pipe, but in practice it suffices to use two vertical rods 81 and 82 each acting on a respective one of the crossbars 13 and 14, thus making it possible by pressing on the long handle 20 to disconnect the clamps 16 and 17 and thus release the positioner 10 from the pipe 1 and the assembly comprising the connector 90 and the bottom saddle 100. A cable 18 connected to the positioner 10 and extending out of the excavation makes it easy to withdraw the positioner 10. A tongs type device could be used for the same purpose.

Once withdrawn, the positioner can be immediately reused for putting another branch connector into place. The same tooling can be re-used quickly, independently of the welding operations proper which are performed after the positioner 10 has been withdrawn.

Once the positioner 10 has been withdrawn from the excavation, the branch connector 90 is held in place on the pipe 1 by the bottom saddle 100, and it is held under conditions that are predetermined and standardized.

The operation of welding the connector 90 onto the pipe 1 can be performed conventionally by applying an electric current to the welding studs 93 which are connected to an electrical resistance incorporated in the connector, e.g. in the manner described in document FR-A-2 714 710. Similarly, the operations of perforating the pipe via the shank 92 of the connector 90 and of screwing a plug onto the shank 92 after the pipe has been perforated can be performed using a screw cap carrier member mounted on the endpiece of the long handle 20 in conventional manner, which may likewise be as described in document FR-A-2 714 710, for example.

The above description is given with reference to a particular example of bottom saddle 100 having a flexible strap to which the branch connector 90 is attached and then held in its final position by tightening the fixing screws 114 and 115. The invention is nevertheless applicable to branch connectors 90 which co-operate with a variety of configurations of bottom saddle 100, 200, and 300. Under such circumstances, the saddle adaptor 110, 210, 310 is of a form that matches the particular bottom saddle 100, 200, or 300, while the remainder of the positioner 10 can be similar to that described above.

Figure 8:
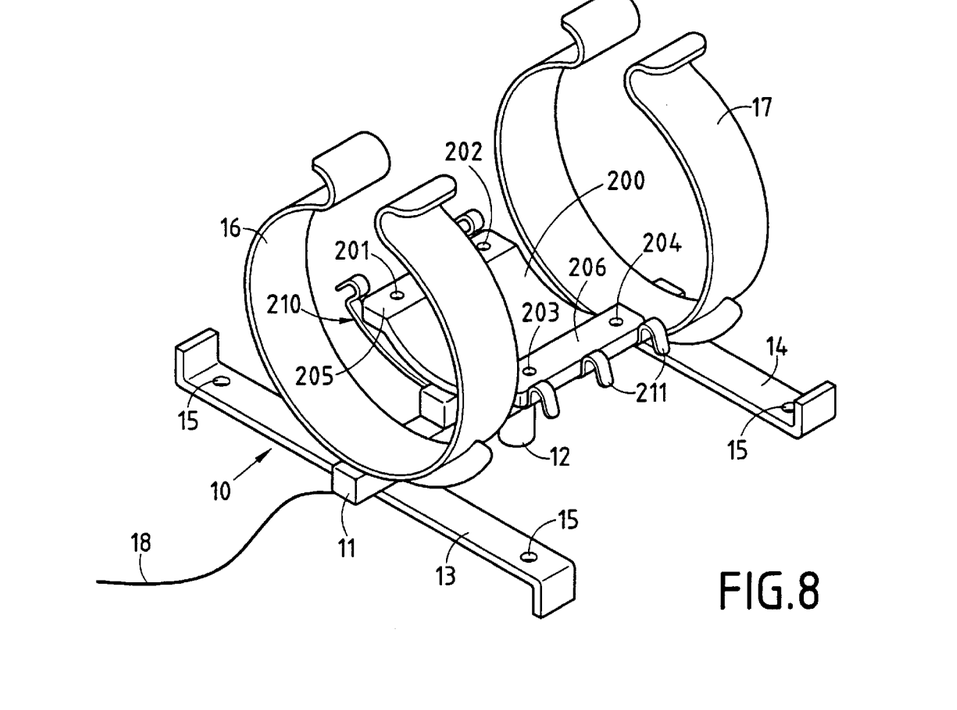
FIG. 8 is a view analogous to that of FIG. 7, but in which a rigid bottom saddle for screw connection is installed in the bottom saddle positioner.

FIG. 8 shows an example of a rigid bottom saddle 200 comprising a central portion in the form of a cradle extended by two horizontal side flanges 205 and 206 provided with perforations 201 to 204. The bottom saddle adaptor 210 has a set of flexible blades 211 fixed on the central beam 11 of the positioner.

Figure 10:
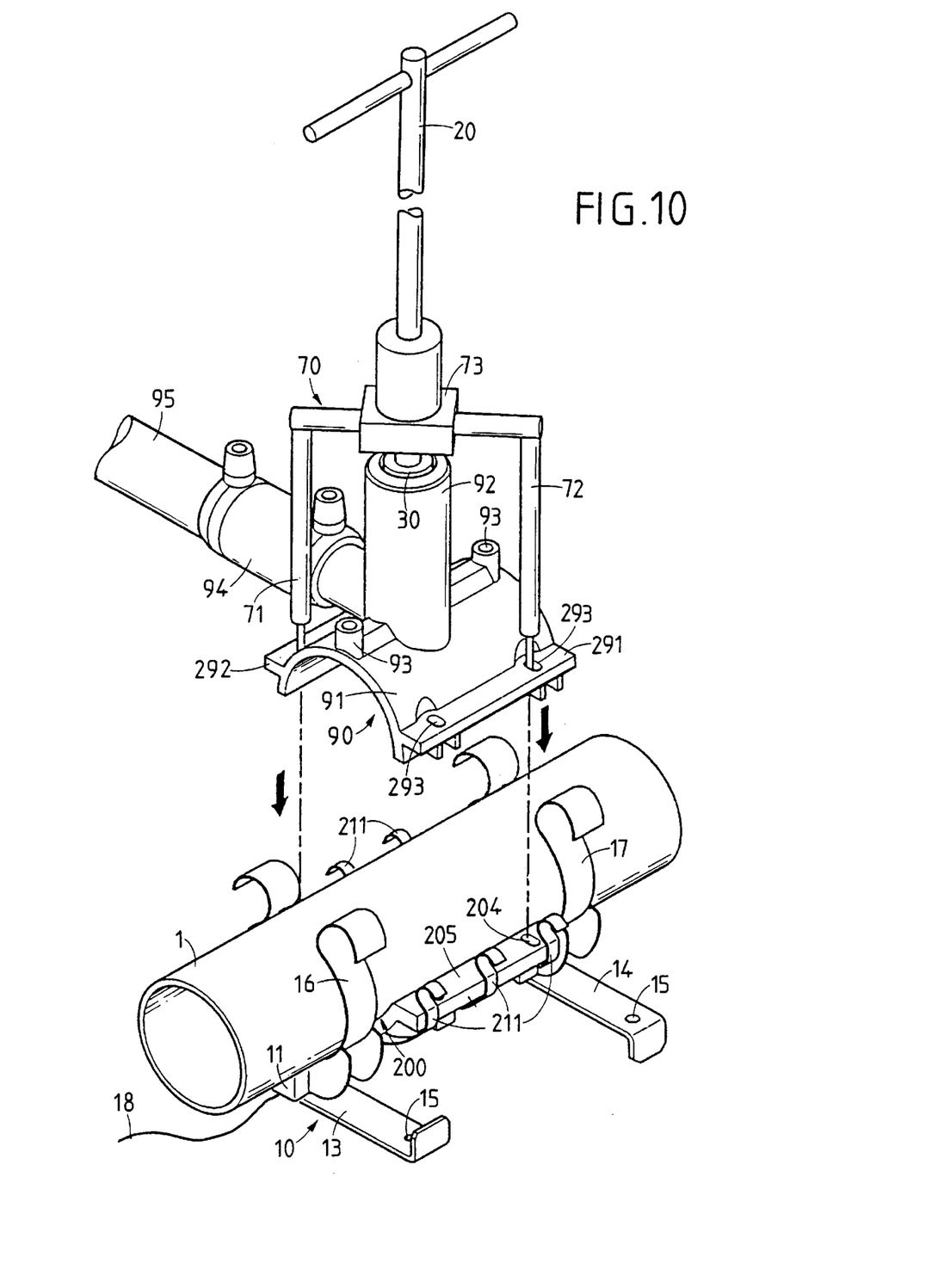
FIG. 10 is a perspective view showing a branch connector being presented to the bottom saddle of FIGS. 8 and 9 while being held by a bottom saddle positioner.

FIG. 10 shows a branch connector 90 adapted to the bottom saddle 200 of FIG. 8 and having two lateral flanges 291 and 292 provided with perforations 293 corresponding to the perforations 201 to 204 of the bottom saddle 200.

Figure 9:
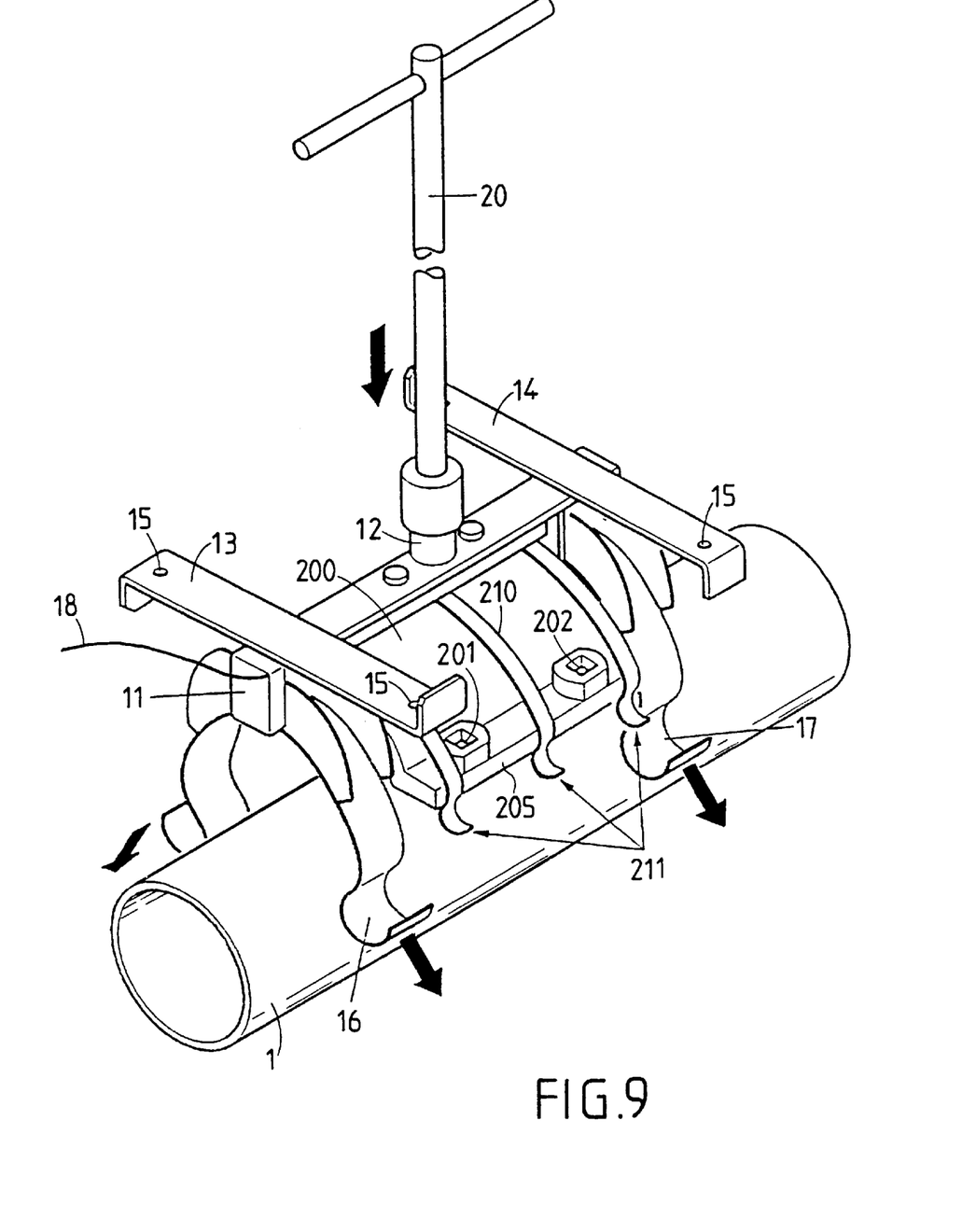
FIG. 9 is a view analogous to that of FIG. 1, but showing a step of presenting, to the top of a pipe, a bottom saddle positioner fitted with a rigid bottom saddle for screw connection of the kind shown in FIG. 8.

The rigid bottom saddle 200 is put into place using the same technique as for the flexible bottom saddle 100. The bottom saddle 200 is initially put into place on the positioner 10 fitted with its adaptor 210, the positioner 10 is lowered onto the pipe 1 (FIG. 9) and the positioner 10 is rotated through 180° to place the saddle 200 underneath the pipe 1 in the position shown in FIG. 10. A threaded endpiece 30 placed on the bottom end of the long handle 20 enables the connector 90 to be fitted to the long handle 20 and enables the connector 90 to be lowered to the pipe 1. As shown in FIG. 10, the threaded endpiece 30 can be associated with additional positioning means 70 fixed by a block 73 to the threaded endpiece 30.

Figure 11:
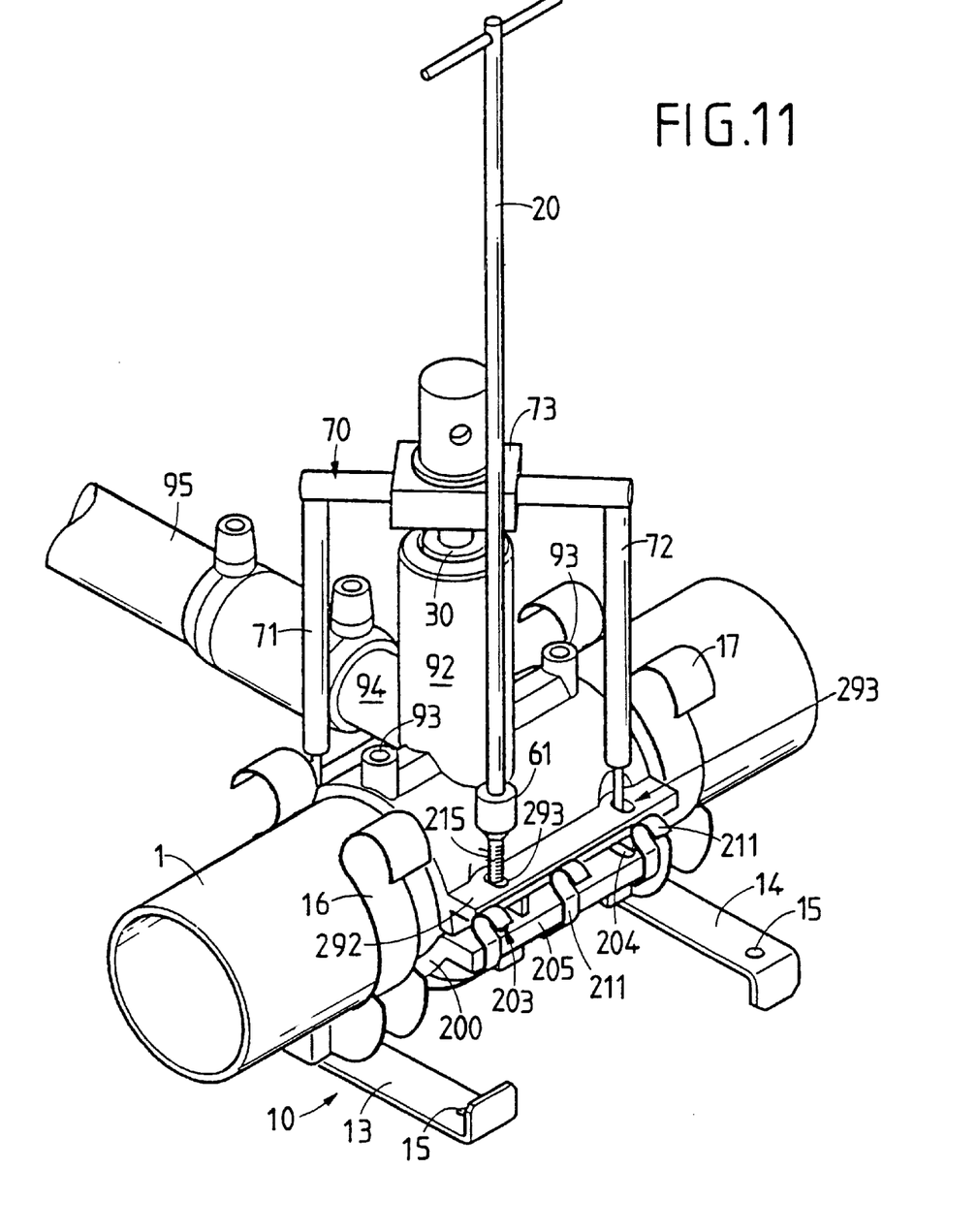
FIG. 11 is a perspective view showing an operation of tightening the screws of a branch connector fitted to a rigid bottom saddle for screw connection of the kind shown in FIGS. 8 to 10.

These positioning means 70 comprise two centering rods 71 and 72 which pass via two fixing holes 293 of the connector 90 and two of the holes 201 to 204 in the bottom saddle 200, thereby ensuring that the holes are accurately centered to one another and thus facilitating installing screws 215 from the top of the excavation, with the screws being inserted in the holes that remain unoccupied by means of a screwdriver tool including an endpiece 61 at the bottom end of the long handle (FIG. 11). The positioner 10 can be withdrawn by means of a tool 80 similar to that shown in FIG. 6 and using the method described with reference to FIG. 6. The following operations of welding the connector 90 to the pipe, of piercing the pipe, and of putting a plug into place on the shank 92 of the connector 90 are conventional, as mentioned above with reference to the first embodiment of the invention.

FIGS. 12 to 17 show another embodiment in which a branch connector 90 which may be quite similar to that shown in FIG. 10 but having fixing side flanges 391 and 392 which are entirely flat and have no need to be pierced, co-operates with a slide-type bottom saddle 300 whose axial position on the positioner 10 can be defined by abutments 28. On either side of a cradle-shaped central portion connected to the beam 11 of a positioner by an adaptor 319 constituted by spring clips, the 10 bottom saddle 300 has a fixed slide 311 for receiving the first flange 391 of the connector 90, and a tiltable slide 312, 314 having a portion 314 capable of tilting down onto an engagement abutment 313 to receive the second flange 392 of the branch connector 90.

Figure 12:
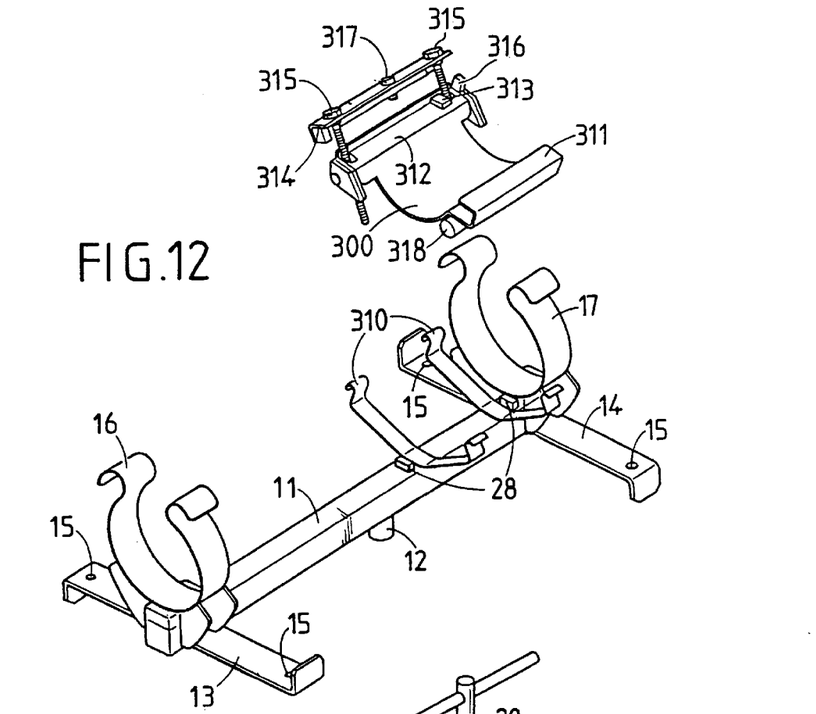
FIG. 12 is a perspective view of a bottom saddle positioner constituting another embodiment associated with a slider type bottom saddle.
Figure 13:
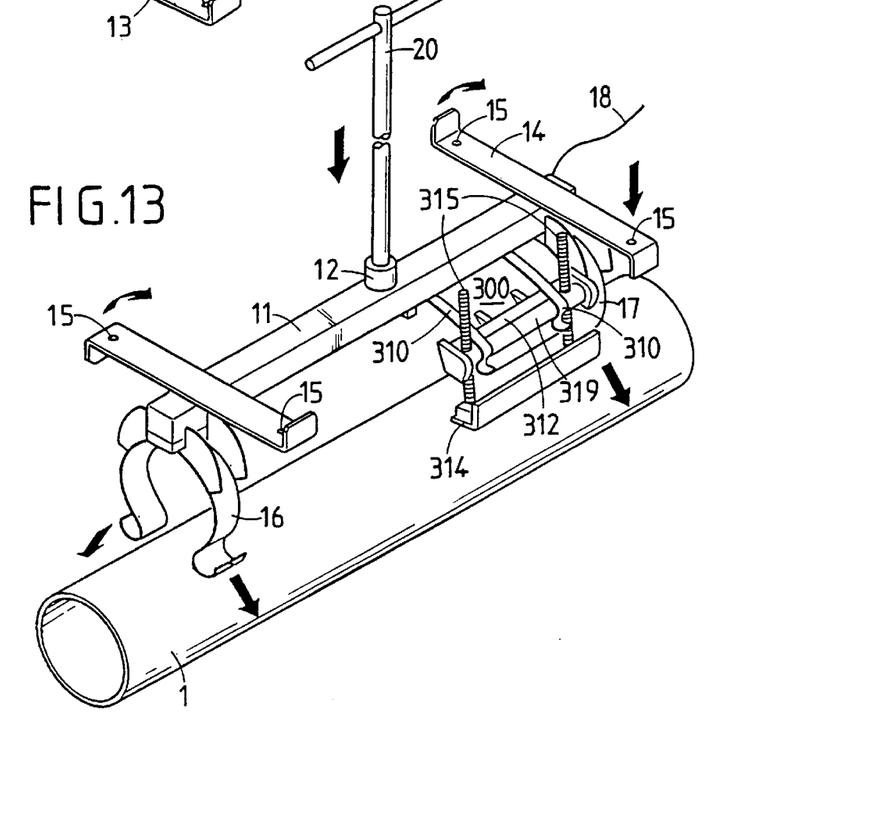
FIG. 13 is a perspective view analogous to FIG. 1, but corresponding to the embodiment of FIG. 12, and it shows a step in which a positioner for a slide type bottom saddle is installed on top of a pipe.
Figure 14:
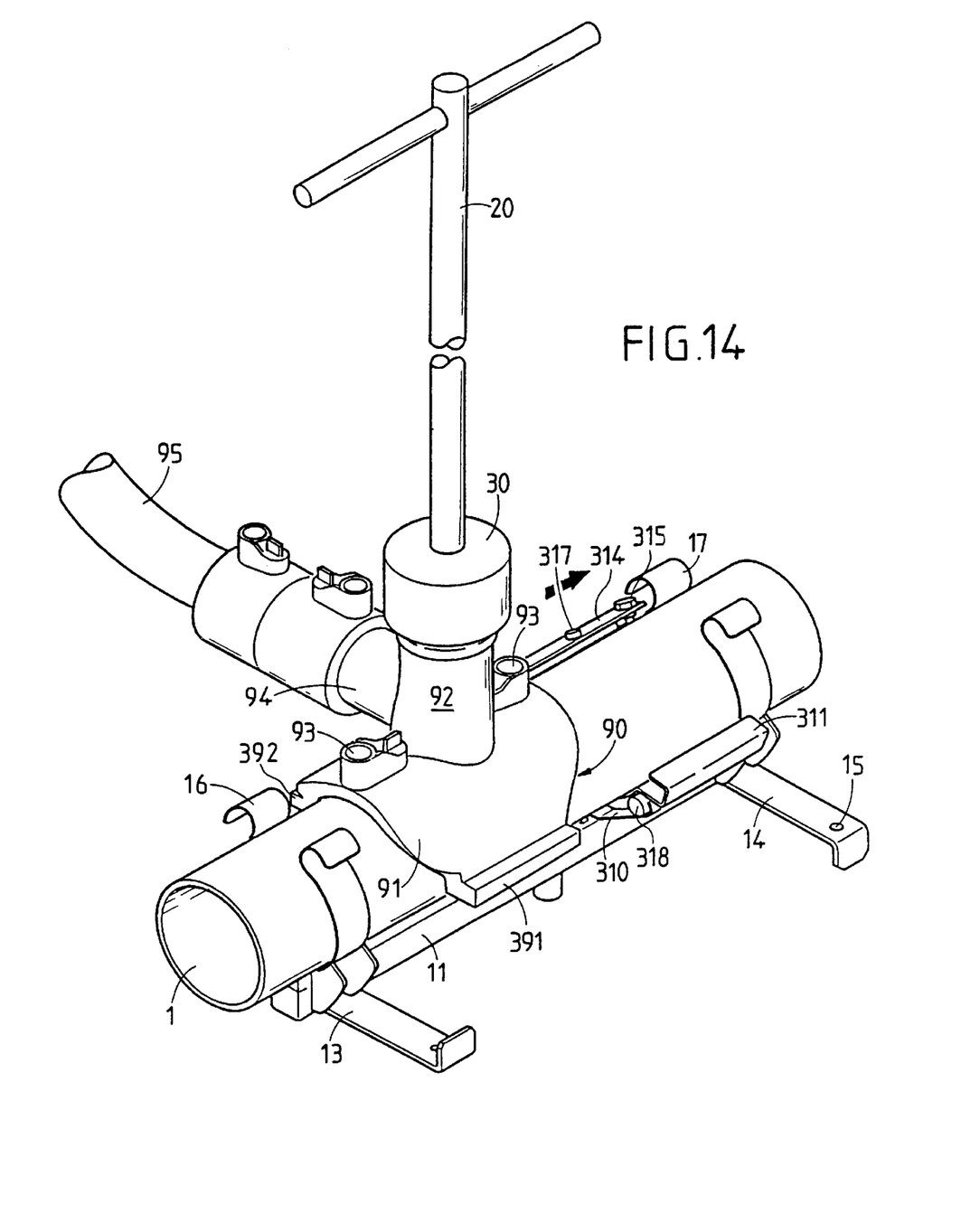
FIG. 14 is a perspective view showing how a branch connector is presented to a length of pipe fitted with the bottom saddle positioner of FIGS. 12 and 13.

As can be seen in FIG. 12, the positioner 10 may be similar to the positioner 10 described above and has a support structure with a longitudinal beam 11 and two crossbars 13 and 14 provided with orifices or blind holes 15, and with two clamps 16, 17 appropriate for the diameter of the pipe, and means 12 for connection to a long handle 20. The process of installing the connector 90 is nevertheless slightly different insofar as the bottom saddle 300 and the branch connector 90 are connected together by sliding the connector 90 axially towards the saddle 300 (with the initial position of the connector being shown in FIG. 14).

Figure 3:
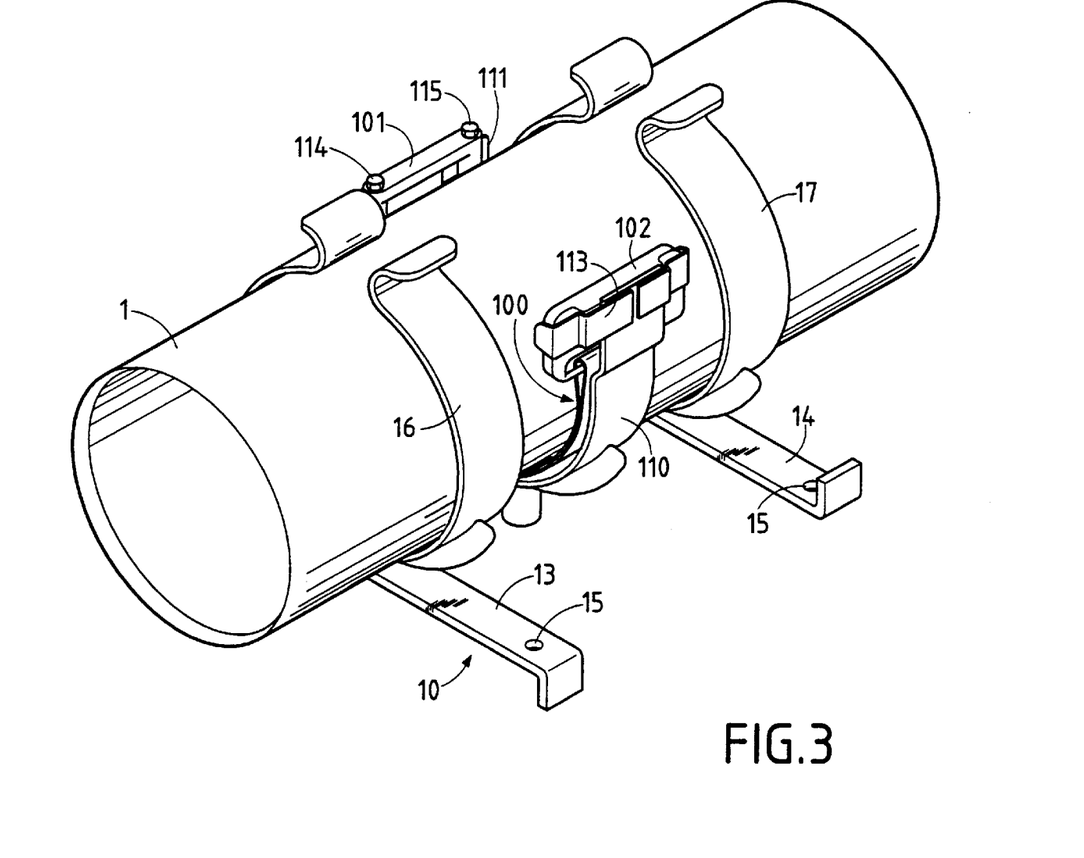
FIG. 3 is a view analogous to FIG. 1, in perspective, showing the bottom saddle positioner of FIGS. 1 and 2 tilted under the pipe.
Figure 15:
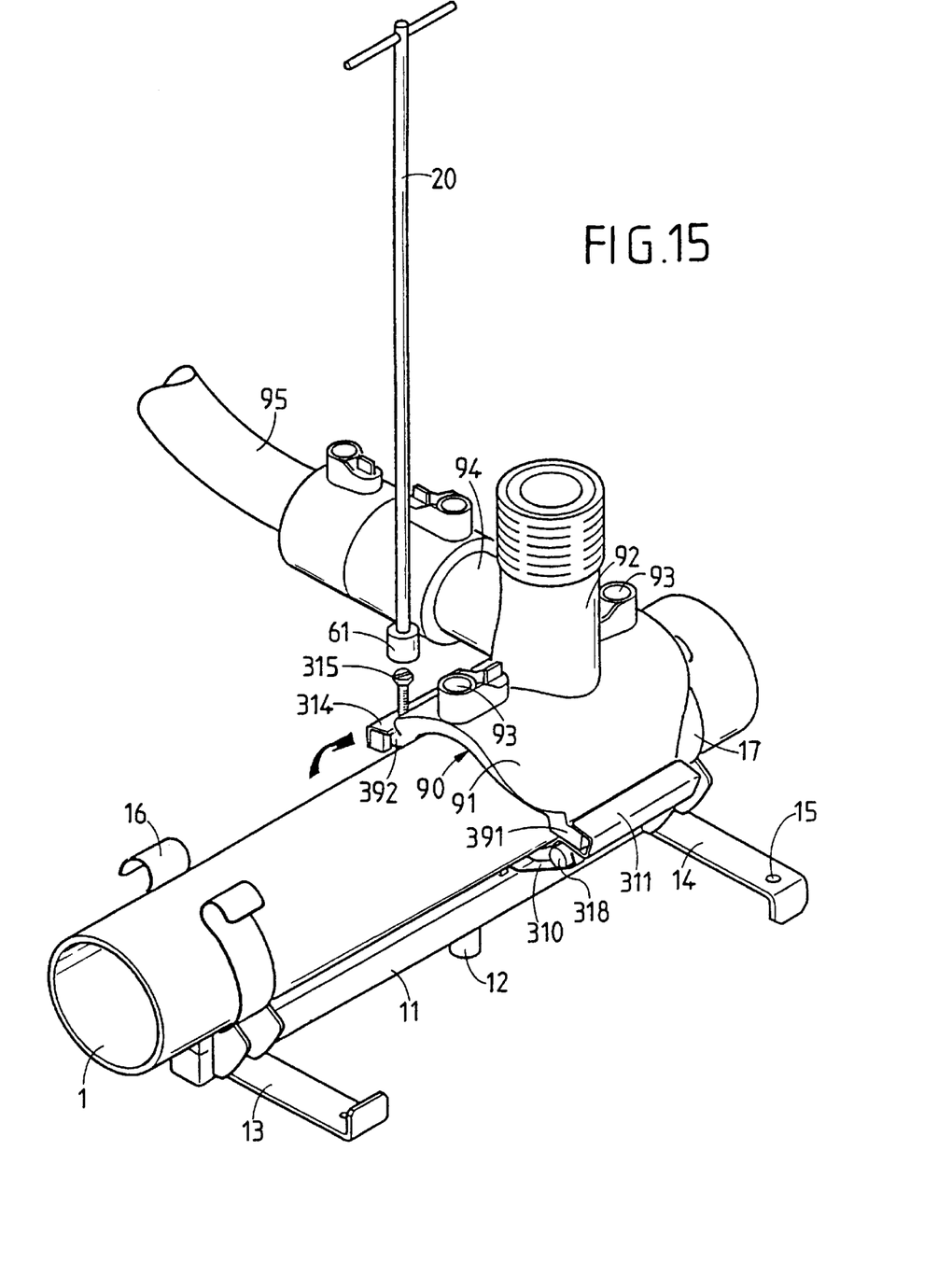
FIG. 15 is a perspective view corresponding to a step following that of FIG. 14 and it shows the branch connector being put into place and clamped in the bottom saddle while it is being held in place by the bottom saddle positioner.

In the embodiment of FIGS. 12 to 17, assembly is performed as follows: the positioner 10 fitted with its clamps or clips 16 and 17 and the bottom saddle 300, as shown in FIG. 12, are initially put into place on the pipe 1 (FIG. 3). The positioner is turned through 180° so as to take up the position shown in FIG. 14. The long handle 20 is then used to lower the branch connector 90 into the position shown in FIG. 14, while the slideway 314 is open. The connector 90 is slid into the fixed slide 311 (or vice versa) as shown in FIG. 15. The portion 314 of the moving slide 312, 314 together with the screws 315 is tilted down by means of a screwdriver attachment fitted to the long handle 20 until the screws 315 come into abutment against the abutment 313 secured to the portion 312 (FIGS. 12 and 14) after which the two screws 315 are tightened to an appropriate extent, with an abutment 316 (FIG. 12) serving to limit tightening. The clamping abutment 313 can be adapted to the type of connector used.

As can be seen in FIG. 12, an element 317 placed on the tiltable portion 314 of the moving slide 312, 314 constitutes a member for centering the connector 90.

FIGS. 13 to 16 also show that the spring clips of the adaptor 310 can engage parts 318 and 319, e.g. cylindrical parts, disposed beneath the fixed slide 311 and the fixed portion 312 of the moving slide 312, 314.

Figure 16:
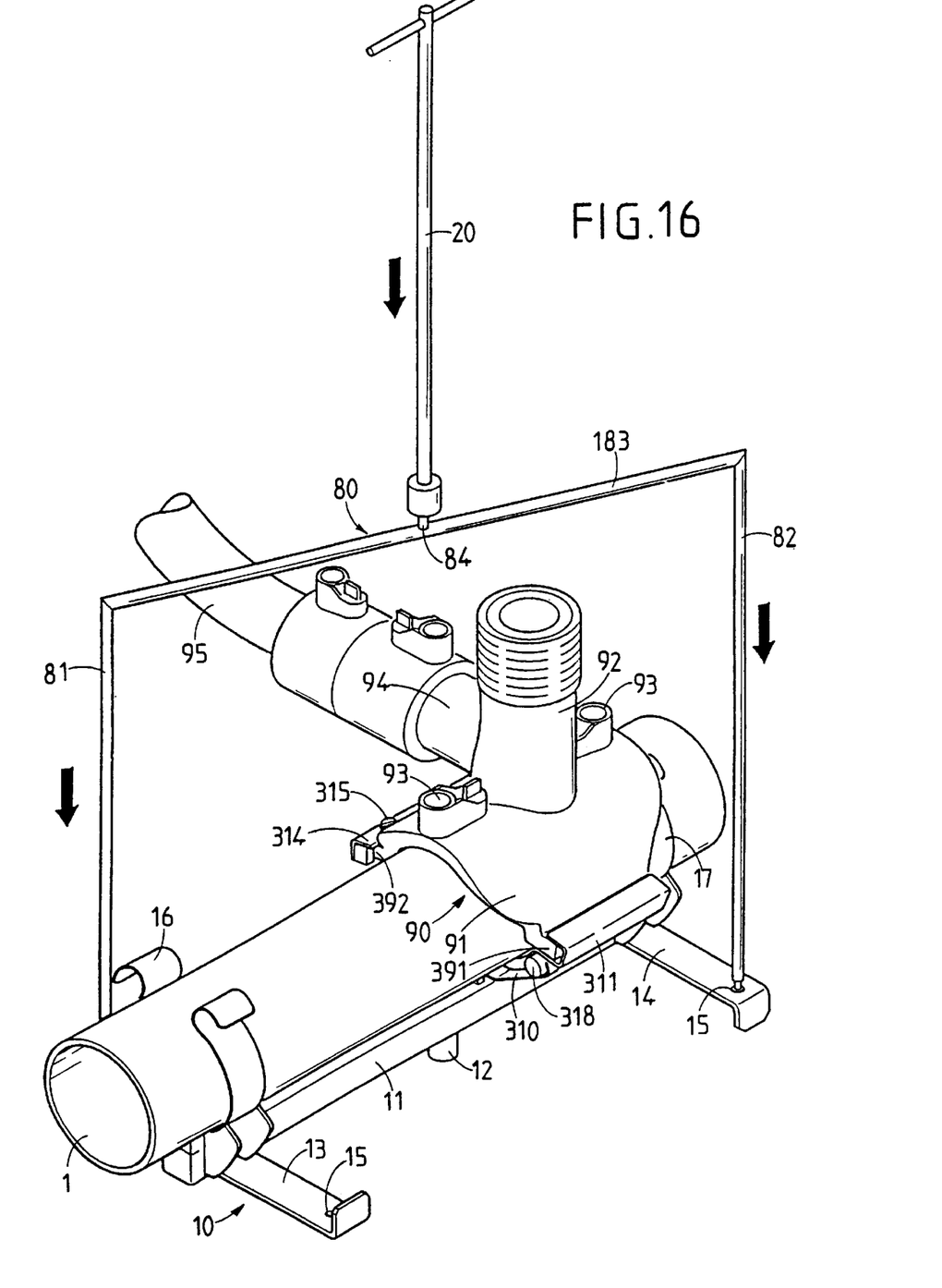
FIG. 16 is a perspective view showing a step following the step of FIG. 15 in which the bottom saddle positioner is removed, the bottom saddle remaining in place to hold the branch connector during the welding operation.

FIG. 16 shows a step of withdrawing the positioner 10 by means of a tool 80 similar to that shown in FIG. 6, but having a horizontal rod 183 interconnecting the vertical branches 81 and 82 that may be rectilinear. The positioner 10 is disconnected by applying a downward vertical force via the long handle 20 against the tool 80 when its vertical arms 81 and 82 are engaged in the crossbars 13 and 14 of the positioner 10.

Figure 17:
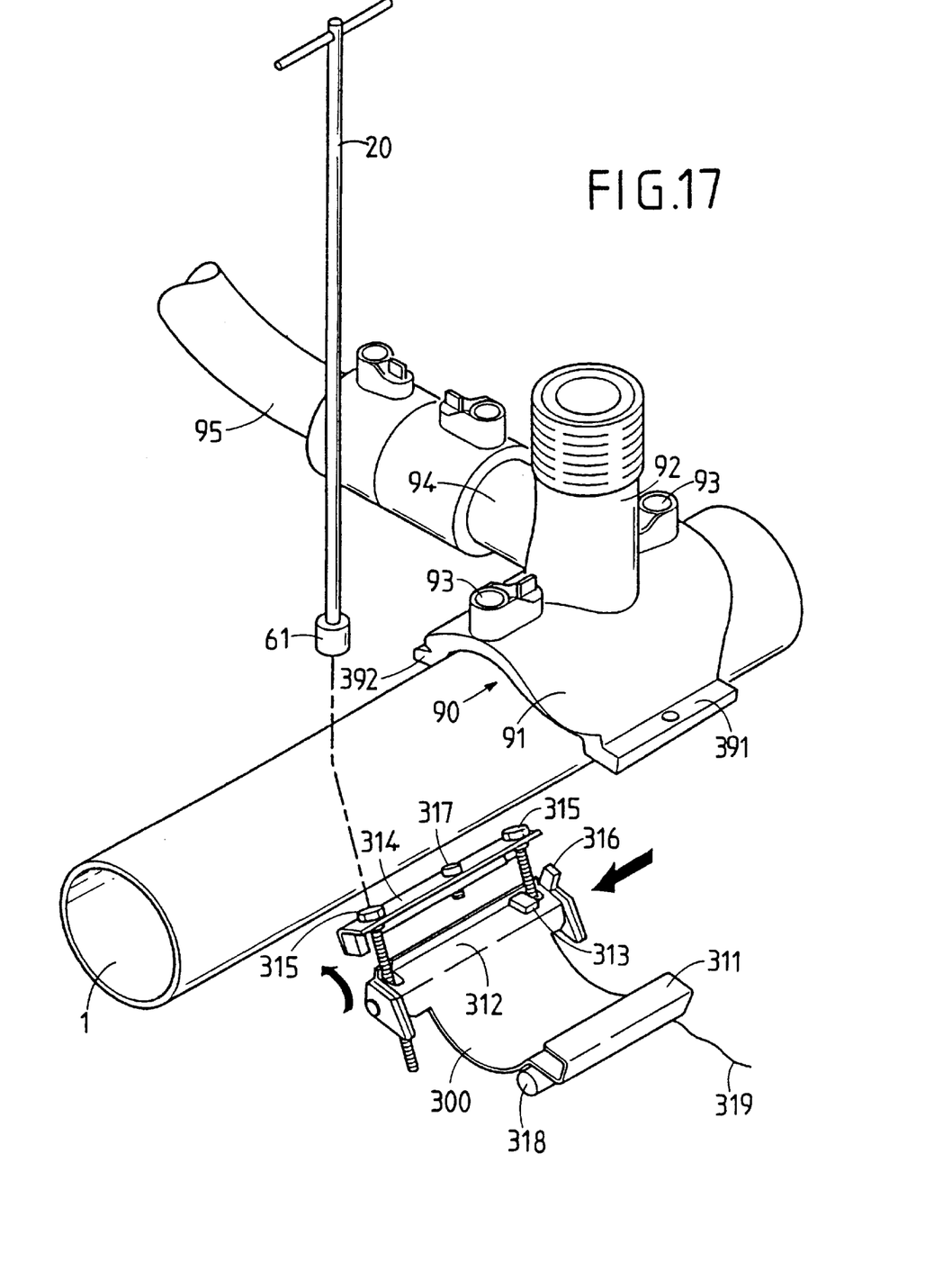
FIG. 17 is a perspective view showing the operation of removing the bottom saddle after the welding operation has been performed.

The bottom saddle 300 remains in place while the connector 90 is being welded to the pipe 1, and during cooling, after which it can be removed merely by loosening the screws 315 using the long handle 20 fitted with a screwdriver attachment 61. The tilting portion 314 of the moving slide 312, 314 can then be opened, thus allowing the bottom saddle 300 to be disengaged from the flanges 391 and 392 of the connector 90, by sliding along the axis of the pipe 1 (FIG. 17). The bottom saddle 300 can then be recovered, e.g. by means of a tool having a clamp, or by means of a cable 319 attached from the beginning to the bottom saddle 300.

What is claimed is:

1. A method of installing a branch connector on a buried pipe for transporting a fluid, from the top of an excavation, the method comprising the following steps:

a) digging an excavation of small size so as to clear away the surrounds of the length of pipe onto which the branch connector is to be installed;

b) installing a bottom saddle that is separable from the branch connector onto a bottom saddle adaptor, itself mounted on a bottom saddle positioner provided with clamps adapted to the diameter of the pipe;

c) lowering the bottom saddle positioner into the excavation by means of a multi-purpose long handle engaging a first portion of the positioner to place the saddle positioner on the pipe;

d) using the clamps to mount the bottom saddle positioner on the cleared away length of pipe;

e) disconnecting the multi-purpose long handle from the positioner and engaging a second portion of the bottom saddle positioner so as to cause it to turn about the pipe until the bottom saddle is positioned beneath the pipe;

f) mounting the shank of the branch connector on the end of the multi-purpose long handle and lowering the branch connector to the pipe;

g) putting the branch connector into place on the bottom saddle and fixing it there by means of a screwdriver end piece fixed to the end of the multi-purpose long handle;

h) using a tool with arms mounted on the multi-purpose long handle to disconnect the positioner from the bottom saddle while leaving the bottom saddle in place;

i) raising the bottom saddle positioner from the excavation; and j) proceeding with the operations of welding the branch connector to the pipe, piercing the pipe through the shank of the branch connector, and then placing a sealing cap on the shank of the connector to seal the fluid after the pipe has been pierced.

2. Apparatus for installing a branch connector on a buried pipe for transporting a fluid, and for doing so by means of a multi-purpose long handle from the top of an excavation, said excavation having cleared away the surroundings of the length of pipe onto which the branch connector is to be installed, the apparatus comprising a bottomll saddle positioner comprising a support structure on which there are disposed firstly a clamp connection adapted to the diameter of the pipe and an adaptor for supporting a bottom saddle, and secondly means removably fixed to the end of the multi-purpose long handle and situated on the opposite side of the support structure relative to the clamp connection, and removable means adaptable to the end of the multi-purpose long handle, said removable means comprising a first element to install the branch connector on the pipe above the bottom saddle which has been initially placed on the top of the pipe, and rotated about the pipe until it is properly positioned on the bottom of the pipe, said removable means further comprising a second element to establish a mechanical connection between the branch connector and the bottom saddle, said removable means further comprising a third element to disconnect the bottom saddle positioner from the pipe while leaving the bottom saddle in place, said removable means further comprising a welding element capable of welding the branch connector to the pipe, said removable means further comprising a piercing element capable of piercing the pipe through the shank of the branch connector and said removable means further comprising a sealing cap placed on said shank to seal the fluid after the pipe has been pierced.

3. Apparatus according to claim 2, wherein the support structure of the bottom saddle positioner comprises a horizontal bar parallel to the length of pipe and two crossbars fixed to the horizontal bar and situated on either side of the bottom saddle adaptor and of the means for removably fixing to the end of the multi-purpose long handle.

4. Apparatus according to claim 3, wherein said third element for disconnecting the bottom saddle positioner relative to the pipe comprises at least two vertical rods connected to an endpiece for fixing to the end of the multi-purpose long handle so that each bears against a respective one of the ends of the crossbars situated on either side of the pipe.

5. Apparatus according to claim 2, wherein the adaptor for a strap-type bottom saddle comprises an arcuate body fixed to idle support structure of the bottom saddle positioner on the same side as the clamp connection, and resilient tongues fixed to the ends of said body of arcuate shape.

6. Apparatus according to claim 2, wherein the adaptor for a rigid-type bottom saddle having screws comprises a set of flexible blades fixed to the support structure of the bottom saddle positioner on the same side as the clamp connection.

7. Apparatus according to claim 2, wherein the adaptor for a slide-up bottom saddle comprises means for removably fixing the bottom saddle to the support structure of the bottom saddle positioner on the same side as the clamp connection.

8. Apparatus according to claim 2, wherein said second element for mechanically connecting the branch connector and the bottom saddle comprises screw means connected to a fixing endpiece at the end of the multi-purpose long handle.

9. Apparatus according to claim 7, wherein the slide-type bottom saddle comprises, on either side of a central portion, firstly a fixed slide for receiving a first flange of the branch connector, and secondly a tiltable slide having a portion capable of tilting and coming down against an abutment to overlie a second flange of the branch connector.

10. Apparatus according to claim 2, wherein:

the adaptor for a rigid-type bottom saddle having screws comprises a set of flexible blades fixed to the support structure of the bottom saddle positioner on the same side as the clamp connection;

the second clement for mechanically connecting the branch connector and the bottom saddle comprises screw means connected to a fixing endpiece at the end of the multi-purpose long handle;

the screw-type bottom saddle comprises on either side of a central portion in the form of a cradle, horizontal flanges pierced by screw-passing holes; and the second element for making a mechanical connection between the branch connector and the bottom saddle also comprises positioning means connected to a fixing endpiece at the end of the multi-purpose long handle and including two rods for holding in position portions penetrating in two of the screw-passing holes formed in the branch connector and in the bottom saddle to hold the branch connector in position relative to the bottom saddle during the beginning of the operation of engaging screws in the screw-passing holes that remain empty.

* * * * *